United States Patent [19]

Snavely et al.

[11] 4,319,718
[45] Mar. 16, 1982

[54] FORAGE HARVESTER CUTTERHEAD AND METHOD OF SHARPENING

[75] Inventors: Benjamin H. Snavely, New Holland; Henry N. Lausch, Denver, both of Pa.

[73] Assignee: Sperry Corporation, New Holland, Pa.

[21] Appl. No.: 857,954

[22] Filed: Dec. 6, 1977

[51] Int. Cl.³ ............................................. B02C 18/06
[52] U.S. Cl. .................................. 241/101.2; 51/246; 241/101.7; 241/222
[58] Field of Search ............... 241/221, 222, 223, 224, 241/225, 301, 292.1, 101.2, 101.7

[56] References Cited

U.S. PATENT DOCUMENTS

| | | | |
|---|---|---|---|
| 1,634,219 | 6/1927 | Smith | 241/225 |
| 2,735,248 | 2/1956 | West et al. | 51/246 |
| 3,059,383 | 10/1962 | Wallin et al. | 51/246 |
| 3,059,384 | 10/1962 | McClellan | 241/221 |
| 3,729,143 | 4/1973 | Wagstaff et al. | 51/249 |
| 3,876,158 | 4/1975 | Rogers | 241/222 |
| 4,055,309 | 10/1977 | Fleming et al. | 241/221 |

*Primary Examiner*—Mark Rosenbaum
*Attorney, Agent, or Firm*—Frank A. Seemar; John B. Mitchell

[57] ABSTRACT

A forage harvester having a cutterhead with underbeveled knives thereon is disclosed. In a preferred embodiment, each knife has a lateral cross sectional configuration closely resembling an isosceles trapezoid with the initial cutting edges formed by the sides and the longer base thereof. Sharpening of the knife results in the formation of a new cutting edge on the side which is closer to the shorter base than the previous cutting edge. The method of performing the sharpening operation is also disclosed.

10 Claims, 8 Drawing Figures

FORAGE HARVESTER CUTTERHEAD AND METHOD OF SHARPENING

BACKGROUND OF THE INVENTION

This invention relates generally to forage harvesters, and particularly to improved knives therefor and a method of sharpening.

Forage harvesters typically collect crop material from the field, chop or reduce the material to substantially uniform lengths by means of a rotating cutterhead, and deliver the material to a trailing forage wagon or similar carrier. The vast majority of the harvesters being used today utilize a cylindrical or reel-type cutterhead which cooperates with a stationary shear bar parallel to the cutterhead axis to cut the material as it is fed over the shear bar into the cylindrical cutting path of the cutterhead.

The most common cutterheads comprise an axially mounted support structure having a plurality of individual knives fixed on the periphery thereof. The cutting edges of the knives may be arranged parallel to the axis of the cutterhead; however, it has been found very advantageous to provide knives that extend in a generally diagonal direction relative to the cutterhead axis and the shear bar, so that the knives shear the material rather than chop it. In this latter configuration, the edges of the knives can only trace a true cylindrical path if the knives are also twisted in addition to being bowed so that the knives form an approximately spiral-like segment of a cylinder.

The operational environment of forage harvesters is such that all component parts, and particularly the knives and cutting edges, are continuously subjected to tremendous potential damaging forces. Additionally, the nature and texture of the crop materials being operated upon are such that the cutting elements are abrasively acted upon to further impede consistently efficient operation. Because of these working conditions, the cutterhead knives require relatively frequent sharpening by, in many cases, integral knife grinding equipment. Much effort has been expended by the industry to reduce the frequency of sharpening and the time required to accomplish it, and at the same time increase the useful life span of the cutting edges. For example, U.S. Pat. Nos. 3,805,660 and 3,635,271 teach the selective application of wear-resistance surfaces to the cutting edge and/or shear bar to promote "self-sharpening".

The increased efficiency sought by the industry has resulted in numerous different blade configurations, sharpening procedures, and blade mounting hardware. The wide range of blade designs can be seen by a view of the drawings in U.S. Pat. Nos. 3,452,796; 3,635,271; 3,677,316; 3,817,464 and 3,729,143. These same patents also show numerous approaches to knife mounting which manufacturers have developed to overcome the efficiency problems. Of particular interest is U.S. Patent No. 3,677,316 which discloses, in the specification and drawings thereof, some of the prior art techniques for sharpening cutter blades. U.S. Pat. No. 2,594,583 also shows a cutter knife design; however, the design is "underbeveled", i.e., the beveled edge is directed toward the center of the cutterhead, as opposed to the conventional opposite arrangement shown in, for example, U.S. Pat. No. 3,677,316.

The invention to be described below is a practical advance in the art which definitely decreases the amount of time necessary to sharpen cutterhead knives and additionally promotes increased efficiency of forage harvester operation.

SUMMARY OF THE INVENTION

It is an object of the instant invention to provide a forage harvester cutterhead knife which is more easily sharpened than those heretofore known.

It is another object of the instant invention to provide a cutterhead knife of improved design which increases operational efficiency.

It is a further object of the instant invention to provide an improved forage harvester which may be sharpened more quickly and easily than those known in the prior art.

It is a further object of the instant invention to provide an improved forage harvester cutterhead which is structurally superior to, and less susceptible to damage from knife lifting than those known in the prior art.

It is a still further object of the instant invention to provide a method of sharpening forage harvester knives.

It is an even still further object of the instant invention to provide a method of sharpening forage harvester cutterhead knives which requires dressing only a single surface of the knife.

These and other objects are obtained according to the instant invention by providing an improved forage harvester cutterhead with underbeveled knives and a method of sharpening same. In a preferred embodiment, each knife has a lateral cross sectional configuration closely resembling an isosceles trapezoid with the initial cutting edges formed by the sides and the longer base thereof. Sharpening of the knife results in the formation of a new cutting edge on the side which is closer to the shorter base than the previous cutting edge.

BRIEF DESCRIPTION OF THE DRAWINGS

The advantages of this invention will become apparent upon consideration of the following detailed disclosure of the invention, especially when it is taken in conjunction with the accompanying drawings wherein.

DESCRIPTION OF THE PREFERRED EMBODIMENT

Figure 1:
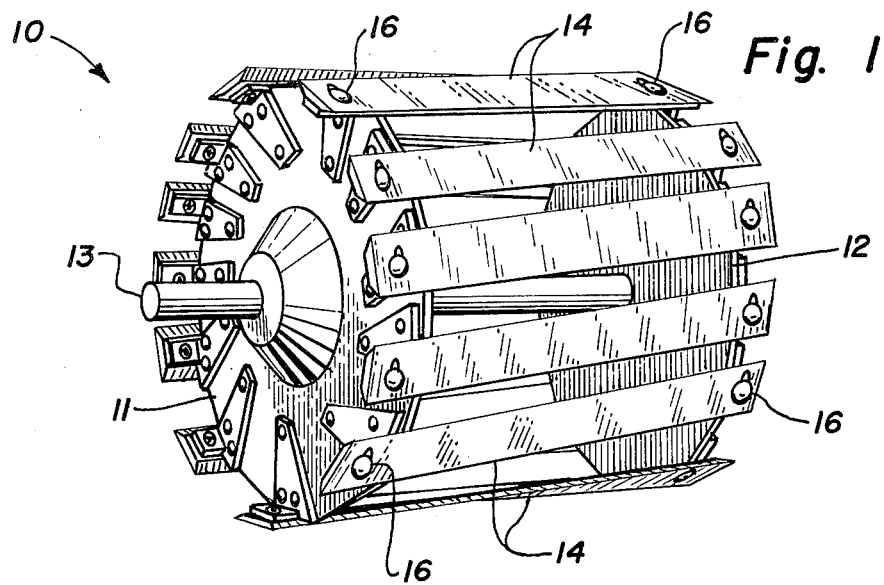
FIG. 1 is a perspective view of the cutterhead of the instant invention, showing the peripherally positioned knives thereon.

Referring now to FIG. 1, a cutterhead 10 constructed according to the teachings of the instant invention can be seen to comprise a pair of substantially circular plate-like supports 11 and 12 spaced apart on, and fixed to, an axial shaft 13. Only two supports are shown in this figure; however, in actual practice it has been found structurally beneficial to employ one or more additional supports intermediate those shown. A plurality of substantially identical cutter knives 14 are positioned about the periphery of the cutterhead and fixed to the supports by a multiplicity of adjustable fasteners, such as threaded screws 16. While it is not uncommon to find knives which are parallel to the shaft 13, it has been found very advantageous to position the knives so as to form a partial spiral about the circumference of the cutterhead. Such a structure is generally known in the art as shown by, for example, U.S. Pat. No. 3,729,143.

Figure 2:
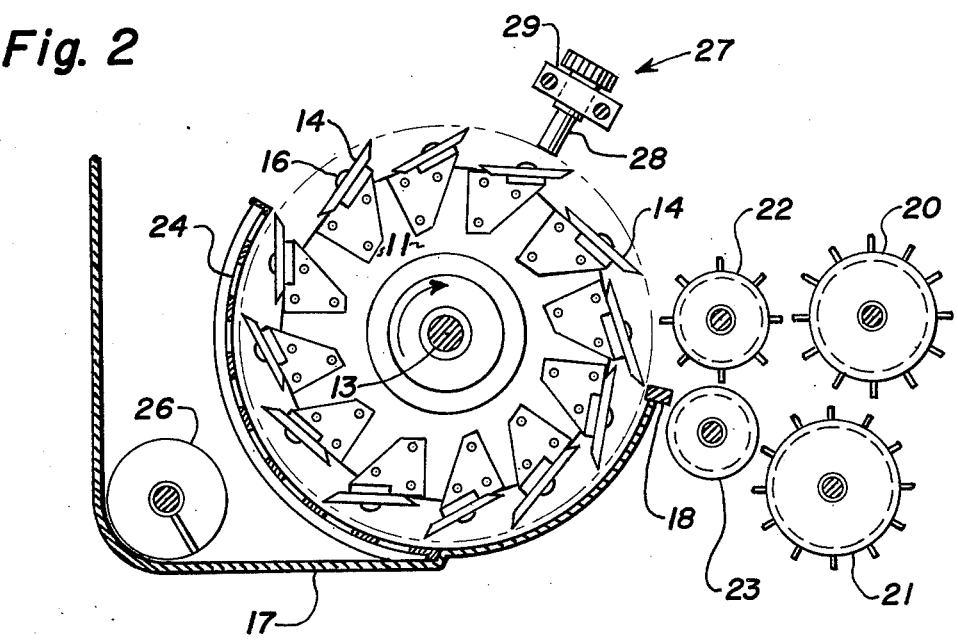
FIG. 2 is a partially schematic side elevational view of the cutterhead of FIG. 1, showing the relationship thereof to other elements of the system.

FIG. 2 shows a schematic side elevational representation of a forage harvester employing the teachings of the instant invention. Cutterhead 10 is mounted on shaft 13 for rotation within a housing 17 and the knives 14 are arranged to coact with a shear bar 18 in the cutting operation. Infeed rollers 20-23 accept crop material from a pickup (not shown) and feed it therethrough in a ribbon-like mass across the shear bar 18 for engagement with knives 14 of cutterhead 10. The material may then be forced through an optional screen 24 which aids in particle sizing to an auger 26 which feeds the material transversely of the harvester to a blower (also not shown). Of course, it should be realized that the instant invention, while shown in a "cut and blow" system, is equally applicable to the "cut and throw" type of forage harvester. The arrangement further includes a sharpening mechanism 27 which includes a grinding stone 28 held in position by a holder 29.

Figure 3:
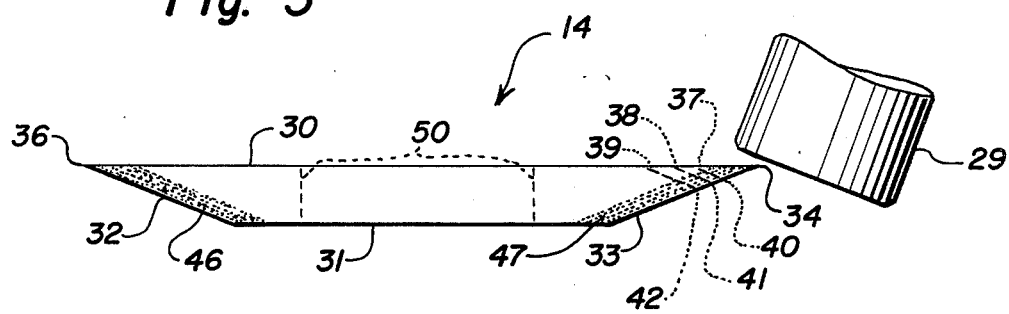
FIG. 3 is a partially schematic, cross sectional view of the cutter knife of the instant invention and its relationship to the grinding member.

Referring now to FIG. 3, the lateral cross section, similar to the end view of FIG. 2, of a knife 14 is shown to comprise a substantially isosceles trapezoidal configuration made up of a long base 30, a shorter base 31, and two equal length sides 32 and 33. Depending upon whether the knife is flat or twisted, the cross section will change very slightly. More specifically, the cross section of a twisted knife will not be an exact isosceles trapezoid; however, the deviation therefrom will be so slight as to be completely insignificant. Initially, the cutting edges 34 and 36 are at the juncture of long base 30 and the respective sides 32 and 33. The structure of blade 14 is a preferred embodiment with a useful life which may be extended by reversal when one cutting surface, say 33, for example, has been sharpened the maximum amount. Though the knife shown in FIG. 3 is preferred in many instances, single edge knives do have utility and such are intended to be included within the scope of the instant invention. For example, single edge knives are very often used with the V-shaped or inverted V-shaped cutterhead configurations.

With the short base 31 affixed to the cutterhead supports, the cutting edge traverses the edge of the shear bar and is trailed by the long base 30. Degradation of the cutting edge results not so much in a loss of knife bulk material, but rather in a rounding of the cutting edge which adversely affects cutting efficiency. The actual timing and need for sharpening is determined through visual inspection of the output material and knife edges by the operator. When sharpening becomes necessary, the operator adjusts the grinding stone 28, through manipulation of holder 29, into an interference position with the cylindrical cutting path of knives 14 and draws the stone across the rotating cutterhead. Thus, as seen in FIG. 3, a portion of the knife is removed and a heel surface is provided thereon. A series of dotted lines 37-39 are used in this figure to represent successive heel surfaces created by successive sharpening steps. Repeated sharpenings result in the creation of new cutting edges which, shown as 40-42, progressively move along the side 33 toward short base 31.

In the embodiment set forth particularly in FIGS. 2 and 3, the sharpening mechanism 27 is fixed by rods or guides at a fixed angle and spacing relative to the cylindrical cutting surface of the cutterhead. The stone 28 is adjustable toward and away from the blades; however, the entire sharpening mechanism 27 is laterally manually movable relative thereto. A similar mechanism is shown in more detail in U.S. Pat. No. 2,735,248. It should be readily apparent that the important feature about this mechanism is its fixed angle of attack on the knife, and the actual mechanics of operation, whether manual or automatic, are irrelevant.

An additional important aspect of the knife 14 is the application of hardened surfaces 46 and 47 on the sides 32 and 33. The position of the hardened surface relative to the cutting edge and shear bar is very important to the life of the cutting edge. Layers 46 and 47 can be of any suitable relatively thin, highly wear-resistant alloy material such as tungsten carbide. The hardened surface may be applied in any conventional manner such as, for example, by welding.

Figure 4A:
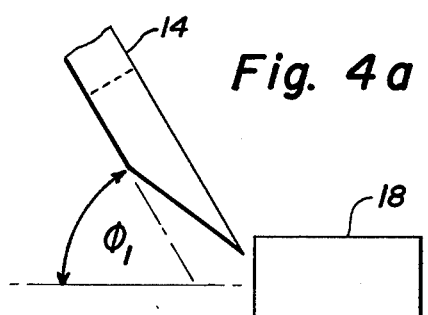
FIGS. 4a-4c show the knife of FIG. 3 as it would progress through a number of sharpenings, and the relative adjustment of the shear bar necessitated thereby.
Figure 4B:
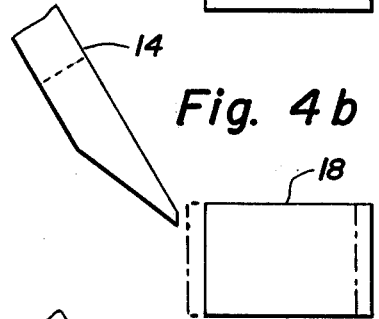
Figure 4C:
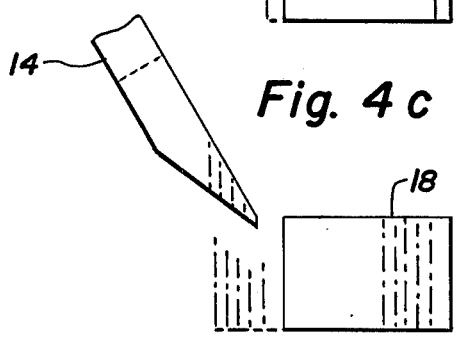

The sharpening process inherently increases the spacing between the cutting edge and the shear bar. The proper gap adjustment which maximizes efficiency is in the range of from about 0.005 inches to about 0.015 inches, and is preferably about 0.010 inches. Once the knife is sharpened, the gap re-adjustment is usually made by modification of the shear bar mounting. FIGS. 4a-4c show the knife 14 as it progresses through a number of sharpenings. The relative adjustment of shear bar 18 is shown in those figures in dotted line. The shear bar, of course, has a maximum adjustability. When this point is reached, the knife 14 may be adjusted slightly by loosening threaded screws 16 and repositioning the knife relative thereto through slots 50 (see FIG. 3). Practical limitations of adjustability are reached when the knife is in its forwardmost position relative to slots 50, and shear bar 18 is adjusted as close as possible to the cutterhead.

Figure 5A:
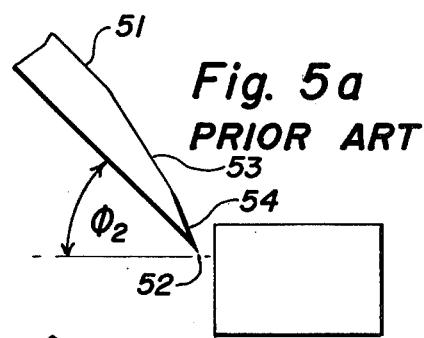
FIGS. 5a and 5b show a prior art knife progressing through a number of sharpenings.
Figure 5B:
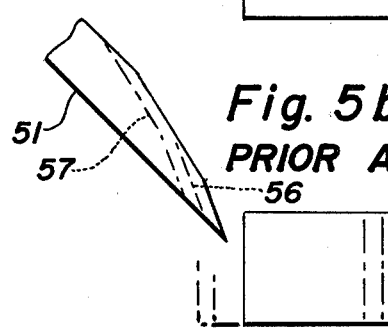

FIGS. 5a and 5b show the prior art cutting knife 51 to be generally the reverse of that used with the instant invention. Knife 51 has a cutting edge 52 made up of a heel 53 and a heel relief 54. The shear bar in this situation is, of course, adjustable as described above. As the cutting edge 52 begins to wear, the knife is sharpened along the dotted line 56. When the heel relief 54 reaches a certain width, approximately ⅜ inch, the efficiency begins to drop off, and thus the heel must be rebeveled as shown in dotted line 57. This type of knife, and sharpening procedure therefor, is generally well known in the art.

The skilled mechanic in this art will readily appreciate the fact that the underbeveled knife of the instant invention will require less time to sharpen than many of the prior art devices. Any suitable manipulation of sharpening process parameters may be employed, such as, for example, reverse rotation of the cutterhead during contact with the grinding stone.

Another advantage of the novel knife and cutterhead of the instant invention is that it permits utilization of a greater angle of attack between the knife and the shear bar. For purposes of this disclosure, we will define the angle of attack, $\phi$, as that angle between the bottom face of the knife, or the planar extension thereof, and a radial line from the axis of rotation of the cutterhead and the point of closest approach of the knife edge to the shear bar. FIG. 4a shows an angle of attack, $\phi_1$, which is about 51°. The prior art of FIG. 5a has an angle of attack, $\phi_2$, of about 42°. Of course, various prior art knives and mounting arrangements result in different angles of attack; however, no arrangement is known which has an angle of attack of approximately 51°, and is yet capable of efficient single step in-situ sharpening. One of skill in the art will readily realize that an increased angle of attack is quite advantageous in the prevention of damage upon knife encounters with metal or stone debris. When a knife is mounted with a relatively large angle of attack, the net forces upon impact with metal or stone tend to move the knife laterally relative to its mounting bolts, as opposed to lifting it relative thereto. A lifting action invariably results in blade-shear bar interference, and thus extensive damage.

It will be understood that various changes in the details, materials, and arrangement of parts which have herein been described and illustrated in order to explain the nature of the invention will occur to and may be made by those skilled in the art upon a reading of the disclosure. All such obvious changes are intended to fall within the scope of the following claims.

Having thus described the invention, what is claimed is:

1. A forage harvester for cutting forage material comprising:
    (a) a housing including a front wall terminating in a forward inlet for receiving forage material and a back wall having an outlet for discharging cut forage material;
    (b) at least two rotatable infeed rolls mounted adjacent said inlet cooperatively arranged to feed the forage material into said inlet along a predetermined path;
    (c) a shear bar adjacent said inlet below said predetermined path, said shear bar being selectively laterally adjustable toward and away from said inlet;
    (d) a rotary cylindrical cutterhead mounted for rotation about its axis in said housing, said cutterhead having a plurality of elongate cutter knives affixed to the periphery thereof and movable therewith in a cylindrical cutting path in coacting cutting relation with said shear bar, each said cutter knife having substantially an isosceles trapezoidal lateral cross sectional configuration with the shorter base closer to the longitudinal axis of the cutterhead and cutting edges formed by the sides and longer base thereof; and
    (e) a sharpening means mounted adjacent said cylindrical cutting path and selectively movable into and away therefrom to engage said cutter knives and positioned to remove a portion of each to form a new cutting edge on each knife on one side thereof closer to the shorter base than the previous cutting edge.

2. The forage harvester of claim 1 wherein said cutter knives each have spiral configurations.

3. The forage harvester of claim 2 wherein said sharpening means comprises:
    an elongate guide means substantially parallel to the axis of said cutterhead;
    a carriage fixed to said guide means and slidable therealong; and
    a sharpening member adjustably fixed to said carriage for movement toward and away from the cylindrical cutting path.

4. A method of sharpening the cutter knives on a forage harvester comprising the steps of:
    (a) providing a rotary cylindrical cutterhead mounted for rotation about its axis, said cutterhead having a plurality of elongate cutter knives affixed to the periphery thereof and movable therewith in a cylindrical cutting path, each said cutter knife having substantially an isosceles trapezoidal lateral cross sectional configuration with the shorter base closer to the axis of the cutterhead and cutting edges formed by the sides and longer base thereof;
    (b) rotating said cutterhead about its axis; and
    (c) sharpening one cutting edge on each knife by contacting said cylindrical cutting path with a sharpening element having a fixed angular relationship therewith forming a new cutting edge on each knife at a location along the side thereof closer to the shorter base than the previous cutting edge.

5. In a method of sharpening the cutter knives on a forage harvester including the steps of providing a rotary cylindrical cutterhead mounted for rotation about its axis, said cutterhead having a plurality of elongate cutter knives affixed to the periphery thereof and movable therewith in a cylindrical cutting path, each said cutter knife having substantially an isosceles trapezoidal lateral cross sectional configuration with the shorter base closer to the axis of the cutterhead and cutting edges formed by the sides and longer base thereof, and rotating said cutterhead about its axis, the improvement comprising the step of:
    forming a new cutting edge on each knife at a location along a side thereof closer to the shorter base than the previous cutting edge by contacting said cylindrical cutting path with a sharpening element having a fixed angular relationship therewith.

6. A forage harvester for cutting forage material comprising:
    (a) a housing including a front wall terminating in a forward inlet for receiving forage material and a back wall having an outlet for discharging cut forage material;
    (b) feeder means mounted adjacent said inlet cooperatively arranged to feed the forage material into said inlet along a predetermined path;
    (c) a shear bar adjacent said inlet below said predetermined path;
    (d) a rotary cylindrical cutterhead mounted for rotation about its axis in said housing, said cutterhead having a plurality of elongate cutter knives affixed to the periphery thereof and movable therewith in a cylindrical cutting path in coacting cutting relation with said shear bar, each said cutter knife including an underbeveled cutting edge formed along a leading side of the knife; and
    (e) a sharpening means mounted adjacent said cylindrical cutting path to engage said cutter knives for removing a portion of each to form a new cutting edge on each knife on said leading side thereof closer to the axis of the cutterhead than the previous cutting edge.

7. The forage harvester of claim 6 wherein said feeder means comprises at least two infeed rolls.

8. The forage harvester of claim 7 wherein said shear bar is selectively laterally adjustable toward and away from said inlet.

9. The forage harvester of claim 8 wherein said cutter knives each have spiral configurations.

10. The forage harvester of claim 9 wherein said sharpening means comprises:

an elongate guide means substantially parallel to the axis of said cutterhead;

a carriage fixed to said guide means and slidable therealong; and a sharpening member adjustably fixed to said carriage for movement toward and away from the cylindrical cutting path.

* * * * *